(12) United States Patent
Hideshima et al.

(10) Patent No.: US 9,330,153 B2
(45) Date of Patent: May 3, 2016

(54) SYSTEM, METHOD, AND COMPUTER READABLE MEDIUM THAT COORDINATES BETWEEN DEVICES USING EXCHANGE OF LOG FILES

(75) Inventors: Gensai Hideshima, Kawasaki (JP); Yoshiyuki Kubota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/112,211

(22) Filed: May 20, 2011

(65) Prior Publication Data

US 2011/0295803 A1 Dec. 1, 2011

(30) Foreign Application Priority Data

May 27, 2010 (JP) ................................ 2010-121862

(51) Int. Cl.
*G06F 17/30* (2006.01)
(52) U.S. Cl.
CPC .... *G06F 17/30575* (2013.01); *G06F 17/30368* (2013.01)
(58) Field of Classification Search
CPC ..................... G06F 17/30575; G06F 17/30368
USPC ......................................... 707/610, 634, 648
See application file for complete search history.

(56) References Cited

U.S. PATENT DOCUMENTS

| | | | | |
|---|---|---|---|---|
| 7,681,069 | B1* | 3/2010 | Chellappa et al. | ........... 714/6.12 |
| 2007/0185937 | A1* | 8/2007 | Prahlad et al. | ................ 707/204 |
| 2008/0208923 | A1 | 8/2008 | Watanabe et al. | |
| 2008/0256073 | A1* | 10/2008 | Detlefs et al. | ..................... 707/8 |

FOREIGN PATENT DOCUMENTS

| | | |
|---|---|---|
| JP | 04-242847 | 8/1992 |
| JP | 2001-318834 | 11/2001 |
| JP | 2002-202906 | 7/2002 |
| JP | 2008-171117 | 7/2008 |

OTHER PUBLICATIONS

Office Action issued Jan. 21, 2014, in Japanese Patent Application No. 2010-121862 (with English-language Translation).
Office Action issued Sep. 30, 2014, in Japanese Patent Application 2010-121862 (with partial English translation).
"Asynchronous update of duplicate file becomes main technology of distributed database", Nikkei Electronics, Japan, Nikkei Business Publication, Inc., vol. 609, pp. 101-110, Jun. 6, 1994.

* cited by examiner

*Primary Examiner* — Alexey Shmatov
(74) *Attorney, Agent, or Firm* — Oblon, McClelland, Maier & Neustadt, L.L.P.

(57) ABSTRACT

A system includes a first storage apparatus and a second storage apparatus. The first storage apparatus includes: a generating unit to generate logs, in response to updates performed on a database in the first storage apparatus, related to the updates; a storage unit to store the logs and data representing the order of generation of each of the logs; and a transmitting unit to transmit, when the logs and the data are stored in the storage unit, the log and the data to the second storage apparatus. The second storage apparatus includes: a receiving unit to receive the logs and the data transmitted by the transmitting unit; and an updating unit to update a database in the second storage apparatus based on the logs in accordance with the order represented by the data.

11 Claims, 10 Drawing Sheets

SYSTEM, METHOD, AND COMPUTER READABLE MEDIUM THAT COORDINATES BETWEEN DEVICES USING EXCHANGE OF LOG FILES

CROSS-REFERENCE TO RELATED APPLICATIONS

This application is based upon and claims the benefit of priority of the prior Japanese Patent Application No. 2010-121862, filed on May 27, 2010, the entire contents of which are incorporated herein by reference.

FIELD

The embodiments disclosed herein are related to a database duplexing system, a storage apparatus, and a database duplexing method.

BACKGROUND

In recent years, a database system has been effectively used to process a huge amount of digital information. To improve the reliability of the database system, a database duplexing configuration is employed in some cases. For example, the publication of Japanese Unexamined Patent Application Publication No. 2002-202906 discloses a system which achieves database duplexing by matching the contents of the database in the first server and the contents of the database in the second server connected to the first server. According to the system of the publication of Japanese Unexamined Patent Application Publication No. 2002-202906, if the copying of information from the first server to the second server fails due to a communication failure between the servers, the information is stored in a difference file. Then, upon recovery, the difference file is transferred to the second server, to thereby reflect the unsuccessfully copied information in the server.

Meanwhile, to guarantee the consistency between two databases, one of the databases needs to be updated in accordance with the order of updates in the other database. However, if an error, such as a failure of a storage area or a file loss, occurs and is later eliminated, the continuity of the updated contents in the database may be interrupted, as in a case in which a change in order occurs between the update performed before the occurrence of the error and the update performed after the elimination of the error.

SUMMARY

According to an aspect of the invention, a system includes a first storage apparatus and a second storage apparatus. The first storage apparatus includes: a generating unit to generate logs, in response to updates performed on a database in the first storage apparatus, related to the updates; a storage unit to store the logs and data representing the order of generation of each of the logs; and a transmitting unit to transmit, when the logs and the data are stored in the storage unit, the log and the data to the second storage apparatus. The second storage apparatus includes: a receiving unit to receive the logs and the data transmitted by the transmitting unit; and an updating unit to update a database in the second storage apparatus based on the logs in accordance with the order represented by the data.

The object and advantages of the invention will be realized and attained by at least the elements, features, and combinations particularly pointed out in the claims.

It is to be understood that both the foregoing general description and the following detailed description are exemplary and explanatory and are not restrictive of the invention, as claimed.

DESCRIPTION OF EMBODIMENTS

A detailed description of example embodiments of a database duplexing system, a storage apparatus, and a database duplexing method disclosed in the present application is provided below and references features illustrated in FIGS. 1 through 10. In the following, description will be made of a database duplexing system for achieving a database duplexing configuration which reflects (mirror-copies) the updated contents of one of two physically independent databases in the other database.

Figure 1:
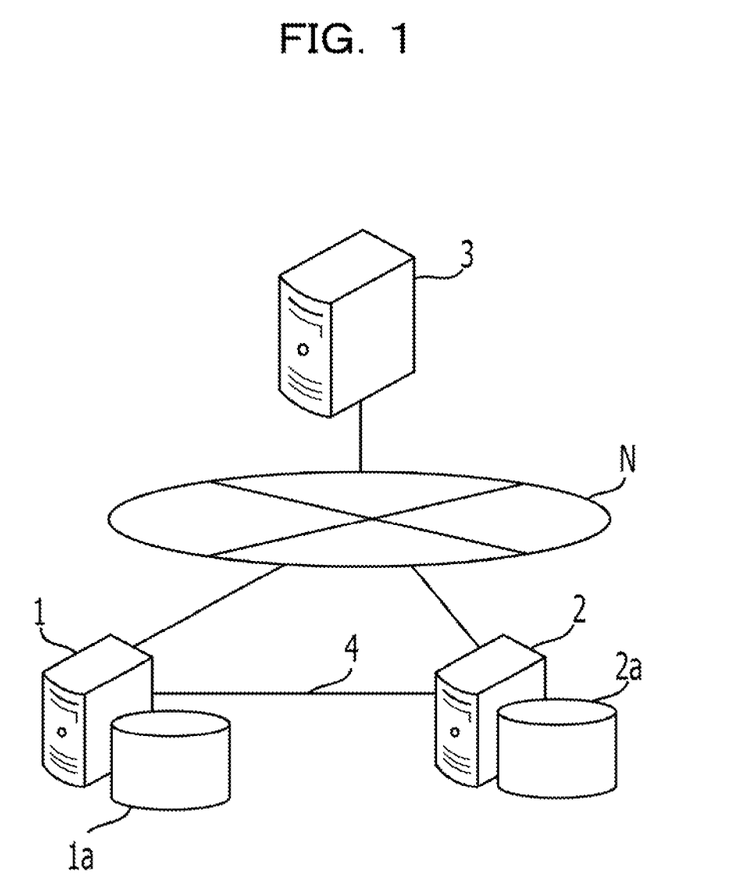
FIG. 1 illustrates a database duplexing system.

FIG. 1 is a diagram schematically illustrating a database duplexing system. The database duplexing system is configured such that a node 1 and a node 2, which include databases 1a and 2a, respectively, and serve as storage apparatuses, and an application server apparatus (hereinafter referred to as the AP server apparatus) 3 are connected via a network N. The network N is a Local Area Network (LAN), a Wide Area Network (WAN), or the like. The node 1 and the node 2 are connected to each other by a data conveying path 4 different from the network N. In the present embodiment, the node 1 and the node 2 will be described as server apparatuses. However, the node 1 and the node 2 may be personal computers each having a communication function. Further, the AP server apparatus 3 may be a personal computer, a Personal Digital Assistant (PDA), a mobile phone, or the like.

The AP server apparatus 3, which performs a variety of applications, is an apparatus for transmitting execution requests of a variety of transactions to the node 1 or the node 2 via the network N. Based on a transaction, the AP server apparatus 3 may request the node 1 to perform the updating of the database 1a, such as the addition, deletion, or change of data. In accordance with the request from the AP server apparatus 3, the node 1 updates the database 1a. In this process, the node 1 generates update logs representing the updated contents of the database 1a, and transmits the generated update logs to the node 2 through the data conveying path 4. Based on the received update logs, the node 2 updates the database 2a in the order of generation of the update logs. Thereby, the database 2a maintains consistency with the database 1a. After the transmission of the update logs to the node 2, the node 1 returns to the AP server apparatus 3 a commit message reporting the completion of the transaction.

In a database duplexing system, a physical or logical failure occurring in the node 1 may inhibit and/or prevent the database 1a from being updated from the AP server apparatus 3 in some cases for a period of time. In such cases, the AP server apparatus 3 switches the access destination from the node 1 to the node 2. As described above, the update of the database 1a of the node 1 is reflected in the database 2a of the node 2. Even if a failure occurs in the node 1, therefore, the switching of the access destination to the node 2 allows the AP server apparatus 3 to continue the updating of the database 2a consistent with the database 1a, without stopping the entire system.

Further, in the database duplexing system, a failure occurring in the node 2 or the data conveying path 4 may inhibit and/or prevent the mirror-copying in some cases for a period of time. In such cases, the mirror-copying is aborted, and the node 1 accumulates the update logs in a device thereof. Upon recovery of the node 2 or the data conveying path 4, the node 1 transmits to the node 2 the update logs accumulated after the abortion of the mirror-copying. Accordingly, it is possible to reflect the updated contents of the database 1a in the database 2a at the same time as the recovery of the node 2 or the data conveying path 4. Further, the node 1 transmits to the node 2 only the update logs generated during the aborted state of the mirror-copying. It is therefore possible to reduce the processing time and the communication volume, as compared with the case in which all update logs are transmitted.

Specific configurations and operations of the node 1 and the node 2 will be described in detail below.

Figure 2:
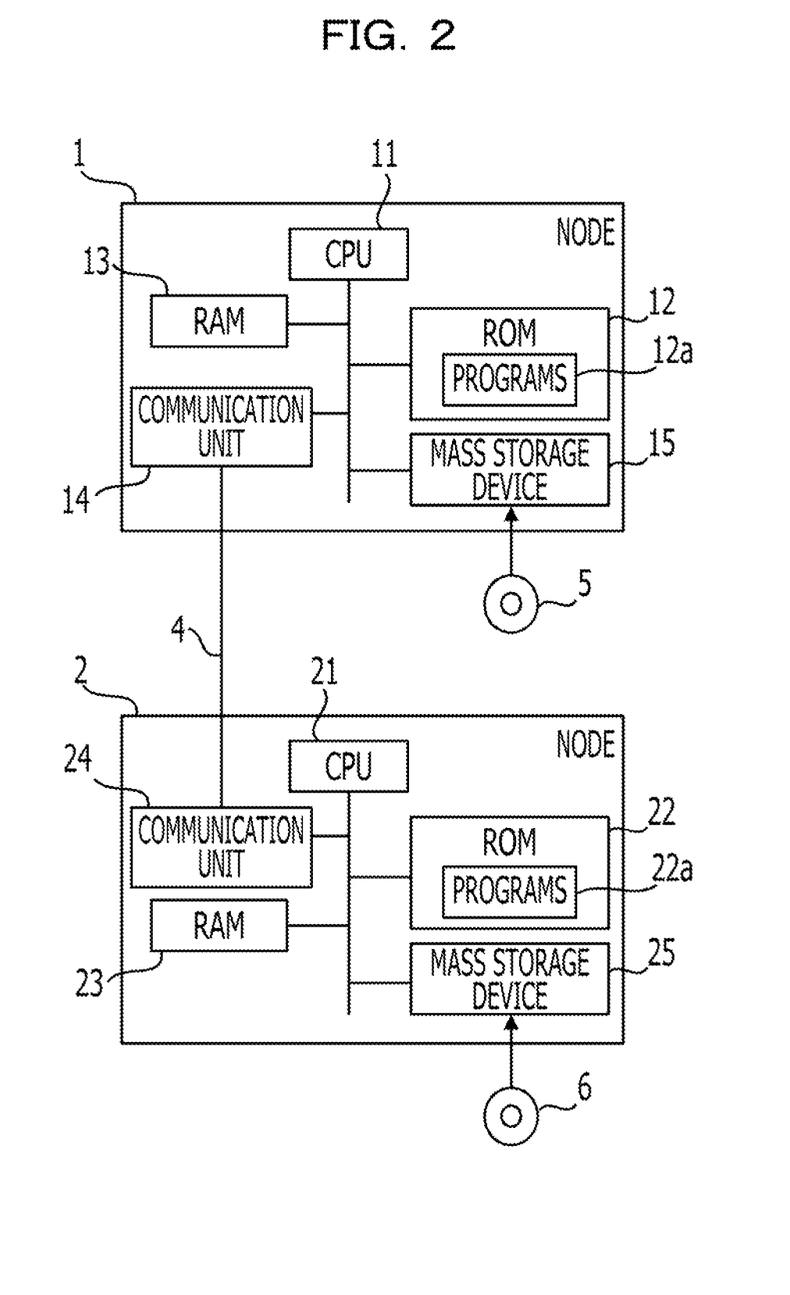
FIG. 2 illustrates example hardware configurations of nodes.

FIG. 2 is a block diagram schematically illustrating respective hardware configurations of the node 1 and the node 2. The node 1 and the node 2 have similar hardware configurations. Therefore, the following description will be made of the node 1, and description of the node 2 will be omitted with the corresponding reference numerals thereof indicated in parentheses.

The node 1 (node 2) includes hardware components, such as a Central Processing Unit (CPU) 11 (21), a Read-Only Memory (ROM) 12 (22), a Random Access Memory (RAM) 13 (23), a communication unit 14 (24), and a mass storage device 15 (25). These hardware components are connected to one another via a bus. The AP server apparatus 3 is formed by a computer including a CPU, a ROM, and so forth, similarly to the node 1 or the node 2, and description thereof will be omitted.

The CPU 11 (21) reads a control program previously stored in the ROM 12 (22) or the mass storage device 15 (25) into the RAM 13 (23), and executes the control program. The CPU 11 (21) also controls the respective operations of the above-described hardware components. The ROM 12 (22) previously stores a variety of control programs 12a (22a) for causing the node 1 (node 2) to perform operations. The RAM 13 (23) is, for example, a Static RAM (SRAM), a Dynamic RAM (DRAM), a flash memory, or the like. The RAM 13 (23) temporarily stores a variety of data generated in the execution of a control program by the CPU 11 (21).

The communication unit 14 (24) connects the node 1 and the node 2 via the data conveying path 4 to allow data communication therebetween. The communication unit 14 (24) also allows the corresponding node to connect to the AP server apparatus 3 via the network N, which is different from the data conveying path 4. The mass storage device 15 (25) is a hard disk drive, for example, and stores the database 1a (2a) or a variety of data, such as update logs, and a variety of control programs. The programs 12a (22a) may be used as installed in the mass storage device 15 (25) from a recording medium 5 (6), such as a Compact Disc-ROM (CD-ROM), a Digital Versatile Disc-ROM (DVD-ROM), or a Magneto-Optical disk (MO), or as downloaded from a network.

Figure 3:
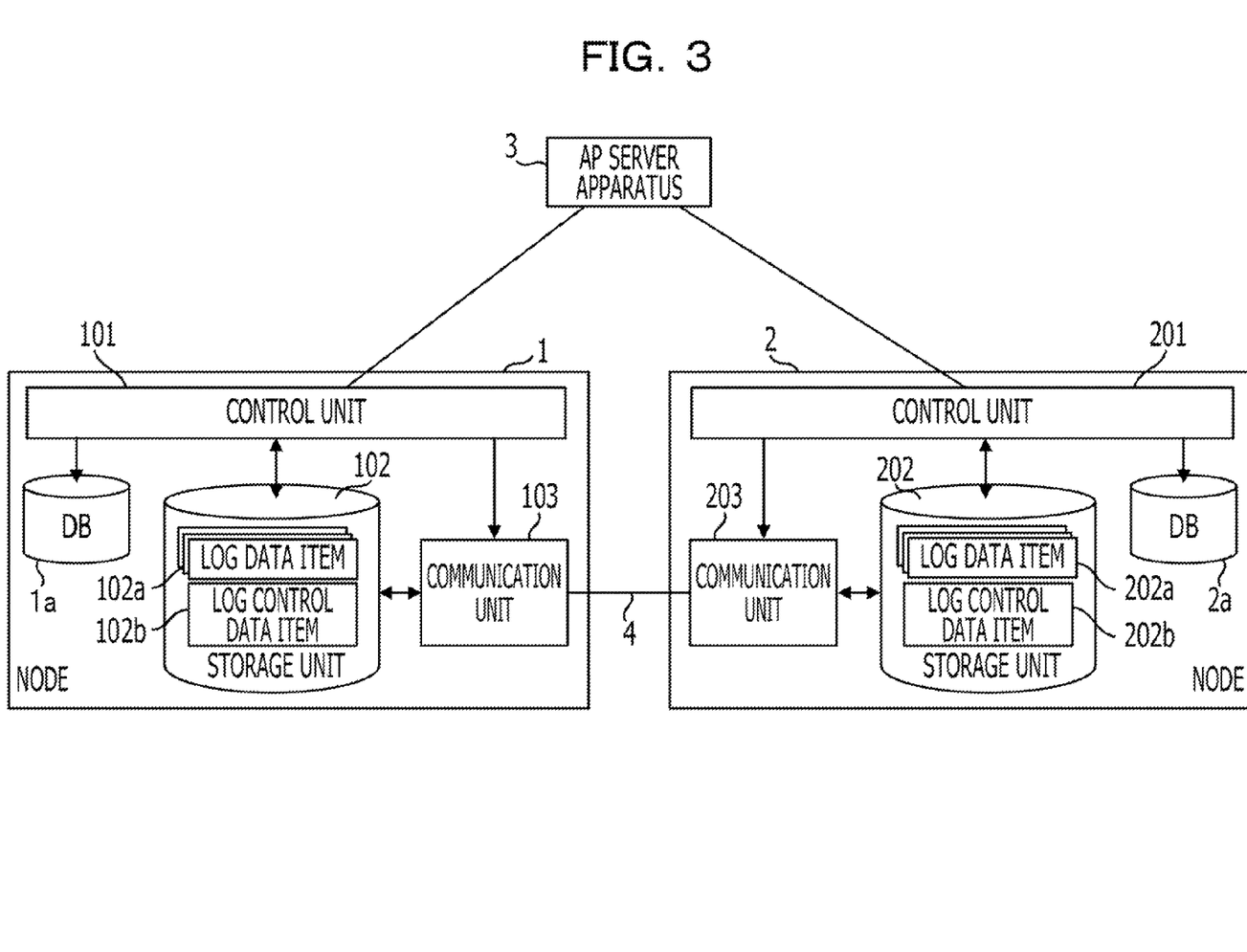
FIG. 3 illustrates respective functions realized by the nodes.

Respective functions and operations realized by the node 1 and the node 2 will be described below. FIG. 3 is a block diagram schematically illustrating the respective functions realized by the node 1 and the node 2.

Example functions realized by the node 1 will be first described. The functions illustrated in FIG. 3 are realized by the execution by the CPU 11 of the programs 12a stored in the ROM 12. The node 1 operates as a control unit 101, a storage unit 102, and a communication unit 103, for example.

In the control unit 101, the Relational DataBase Management System (RDBMS) is executed, and a request from the AP server apparatus 3 is received. In accordance with the request, the control unit 101 performs the process of updating the database 1a, such as the storage or reading of data, for example. The control unit 101 generates the update logs of the updated contents of the database 1a. The update logs include, for example, the contents of data before and after the update, the storage position information of the data, or the like. The storage unit 102 corresponds to the mass storage device 15 storing the database 1a, and stores a plurality of log data items 102a and a log control data item 102b. The control unit 101 writes the generated update logs in one of the plurality of log data items 102a, and writes write information of the log data item 102a in the log control data item 102b.

Figure 4:
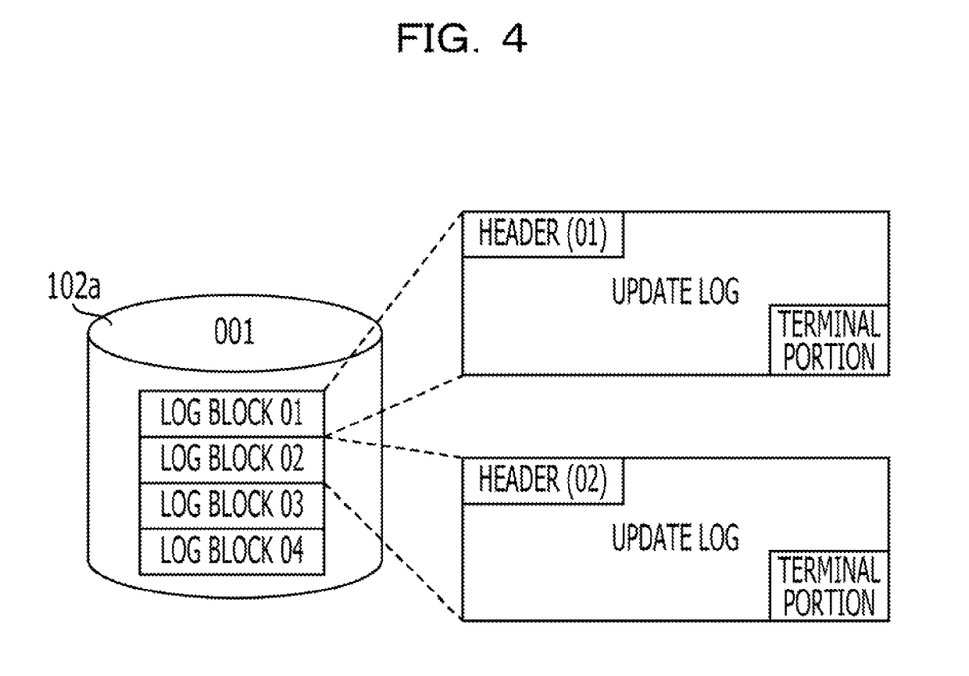
FIG. 4 illustrates an example data structure of log data.

FIG. 4 is a diagram schematically illustrating a data structure of the log data item 102a. The plurality of log data items 102a are assigned with consecutive unique numbers (hereinafter referred to as the log numbers), such as "001" and "002". Each of the log data items 102a has a capacity allowing a plurality of update logs generated by the control unit 101 to be written therein. Each of the update logs is written in the log data item 102a as a log block added with a header storing information identifying the update log and a terminal portion storing information identifying the terminal of the update log. The header stores a unique number, which is consecutive to the numbers of the log blocks. This number will be hereinafter referred to as the block number. For example, the block number of the log block first written in the log data item 102a is represented as "01," and the block number of the subsequently written log block is represented as "02." Upon writing of the log blocks, the log data item 102a is transmitted by the communication unit 103 to the node 2 through the data conveying path 4. The node 2 is capable of checking the continuity of the log blocks by checking the block numbers of the log blocks. That is, in the node 2, the data in the database 2a is updated in the order of updates of the data in the database 1a. Accordingly, it is possible to perform accurate mirror-copying.

Figure 5:
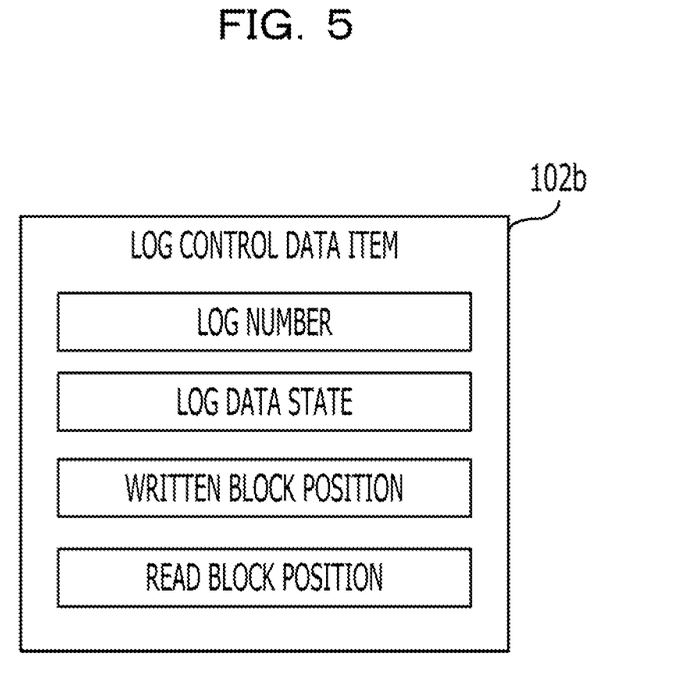
FIG. 5 illustrates an example data structure of log control data.

FIG. 5 is a diagram schematically illustrating a data structure of the log control data item 102b. In the log control data item 102b, information items such as "log number," "log data state," "written block position," and "read block position" are written. If the control unit 101 writes a log block in the log data item 102a, the information items are written in the log control data item 102b by the control unit 101 as the write information. The log number of the log data item 102a as the write destination of the log block to be written by the control unit 101 is written in the "log number." The state of the log data item 102a, in which the control unit 101 has written the log block, is written in the "log data state." For example, if the writing of the log block is normally completed, "normal" is written in the "log data state." Further, if an I/O error occurs and causes a failure to write the log block, "abnormal" is written in the "log data state." The I/O error occurs in cases such as a failure of the storage unit 102, damage on the log data item 102a, or the shortage of capacity allowing the log block to be written therein, for example. The block number of the log block written in the log data item 102a by the control unit 101 is written in the "written block position." If "abnormal" is written in the "log data state," no information is written in the "written block position." The block number of the log block read in the node 2 is written in the "read block position." That is, no information is written in the "read block position" in the node 1.

Subsequently, description will be made of a case in which an I/O error has occurred in the writing of a log block in a log data item 102a by the control unit 101.

Figure 6A:
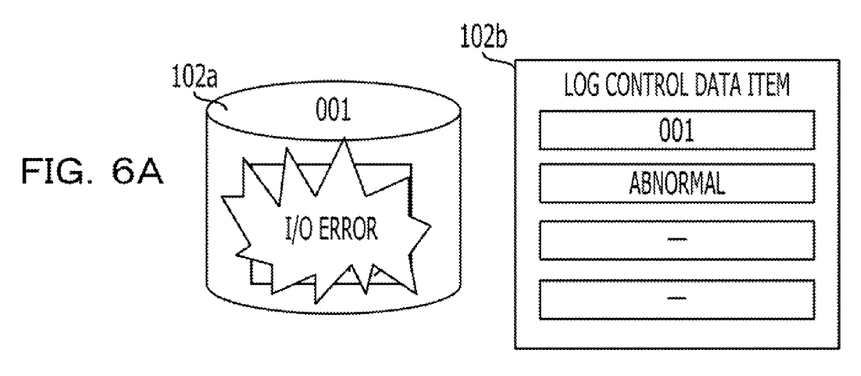
FIGS. 6A and 6B illustrate data written in the log data and the log control data in the event of an I/O (Input/Output) error.
Figure 6B:
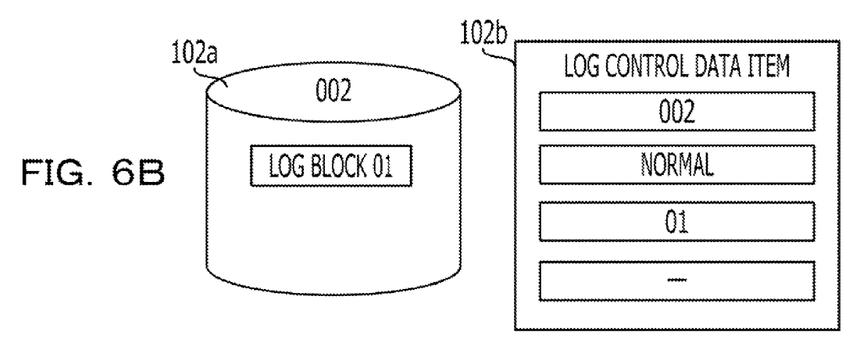

FIGS. 6A and 6B are schematic diagrams for explaining data written in the log data item 102a and the log control data item 102b in the event of an I/O error. If an I/O error occurs in the writing of a log block in a log data item 102a, the control unit 101 writes the log block in another log data item 102a in accordance with the order of consecutive log numbers. For example, if the database 1a is updated, the control unit 101 starts writing a log block in the log data item 102a corresponding to the log number "001." In this process, the control unit 101 writes "001" in the "log number" of the log control data item 102b. If the I/O error occurs and prevents the log block from being written in the log data item 102a corresponding to the log number "001," the control unit 101 skips the writing of the log block in the log data item 102a corresponding to the log number "001," and writes "abnormal" in the "log data state" of the log control data item 102b. Then, the control unit 101 writes the log block in the log data item 102a corresponding to the log number "002," and writes "002" in the "log number" of the log control data item 102b. If the writing of the log block in the log data item 102a corresponding to the log number "002" has normally been performed, the control unit 101 writes "normal" in the "log data state" of the log control data item 102b, and writes the block number "01" of the written log block in the "written block position."

When the I/O error occurs, the control unit 101 may chronologically write the information items in a log control data item 102b, or may write the information items in different log control data items 102b. If the information items are written in different log control data items 102b, the log control data items 102b may be assigned with consecutive numbers to determine the order of reference of the log control data items 102b in the node 2.

Every time the information items are written in the log data item 102a and the log control data item 102b, the control unit 101 causes the communication unit 103 to transmit the log data item 102a and the log control data item 102b to the node 2 through the data conveying path 4. Further, if an abnormality occurs in the node 2 or the data conveying path 4, the control unit 101 causes the communication unit 103 to abort the transmission, i.e., mirror-copying of the log data item 102a and the log control data item 102b. Whether or not an abnormality has occurred in the node 2 or the data conveying path 4 may be detected by the node 1, or may be notified by the AP server apparatus 3. If the abnormality is eliminated, the control unit 101 resumes the mirror-copying. In this process, the control unit 101 transmits the difference between before and after the abortion of the transmission, i.e., the log data item 102a and the log control data item 102b, in which the information items have been written during the aborted state of the mirror-copying. To identify the log data item 102a and so forth, in which the information items have been written during the aborted state of the mirror-copying, a flag may be set, or the log data item 102a and so forth may be stored in another storage area of the storage unit 102, for example. With this configuration, the node 1 transmits the difference. It is therefore possible to reduce the processing time taken for the mirror-copying performed after the recovery, and to reduce the communication volume. When the abnormality is eliminated and the transmission is resumed, the control unit 101 may resume the transmission upon receipt of an input of a command from a keyboard or the like or upon receipt of an instruction from the AP server apparatus 3 to the node 1, for example.

Subsequently, example functions realized by the node 2 will be described. The functions of the node 2 illustrated in FIG. 3 are realized by the execution by the CPU 21 of the programs 22a stored in the ROM 22. The node 2 operates as a control unit 201, a storage unit 202, and a communication unit 203, for example.

The communication unit 203 of the node 2 receives the log data item 102a and the log control data item 102b transmitted from the node 1. The storage unit 202 corresponds to the mass storage device 25 storing the database 2a, and stores the log data item 102a and the log control data item 102b received by the communication unit 203. The log data item 102a and the log control data item 102b stored in the storage unit 202 will be hereinafter referred to as the log data item 202a and the log control data item 202b.

In the control unit 201, the RDBMS is executed similarly as in the control unit 101. The control unit 201 checks the continuity of the log blocks on the basis of the block numbers of the log blocks written in the log data item 202a stored in the storage unit 202. As described above, the block numbers are consecutive unique values. If the block numbers are consecutive, the update of the database 1a is chronologically reflected in the node 2. In this case, the control unit 201 performs the mirror-copying on the basis of the log data item 202a and the log control data item 202b. If it is determined in the node 2 that the block numbers are not consecutive, the node 2 disallows the use of the database 2a. Thereby, the database 2a in an inconsistent state with the database 1a is prevented from being updated from the AP server apparatus 3.

When performing the mirror-copying, the control unit 201 reads the information of the "log number" and the "log data state" in the log control data item 202b. For example, in the case of FIGS. 6A and 6B, on the basis of the information of the "log number" and the "log data state" in the log control data item 202b, the control unit 201 determines that the log data item 202a corresponding to the log number "001" is abnormal. Therefore, the control unit 201 skips the reading of log blocks from the log data item 202a corresponding to the log number "001." Then, the control unit 201 reads the log block corresponding to the block number "01" from the log data item 202a corresponding to the log number "002," and reflects the log block in the database 2a. In this process, the control unit 201 writes the block number "01" of the read log block in the "read block position." Thereby, the updated contents of the database 1a are reflected in the database 2a. The log control data item 202b, in which the block number has been written in the "read block position," is transmitted to the node 1 by the communication unit 203. The node 1 reads the log block, and is notified that the update of the database 1a has been reflected in the database 2a.

Example, respective processes performed by the node 1 and the node 2 will be described below.

Figure 7:
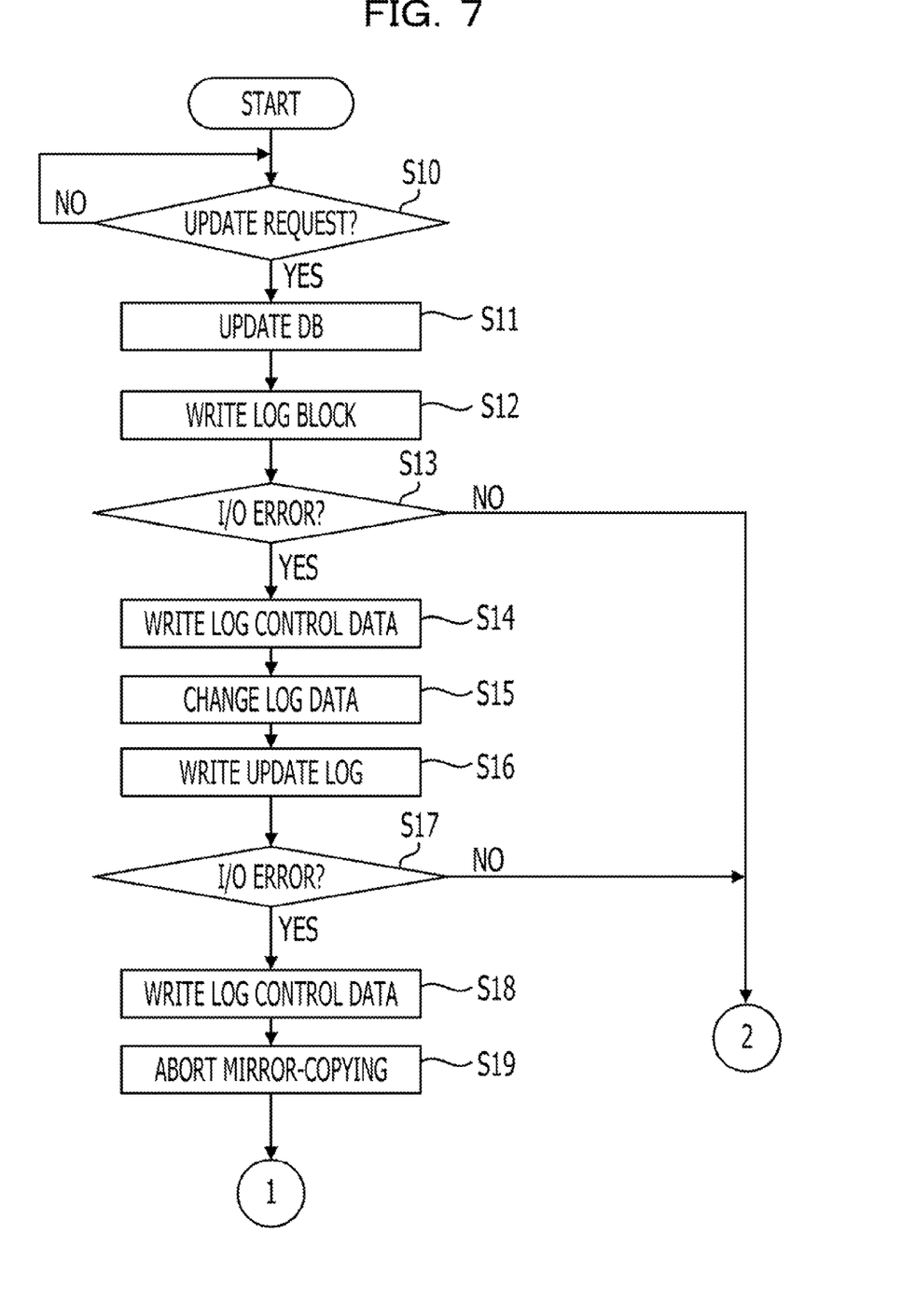
FIG. 7 illustrates a flowchart illustrating an example procedure of a process of writing log blocks in the log data.
Figure 8:
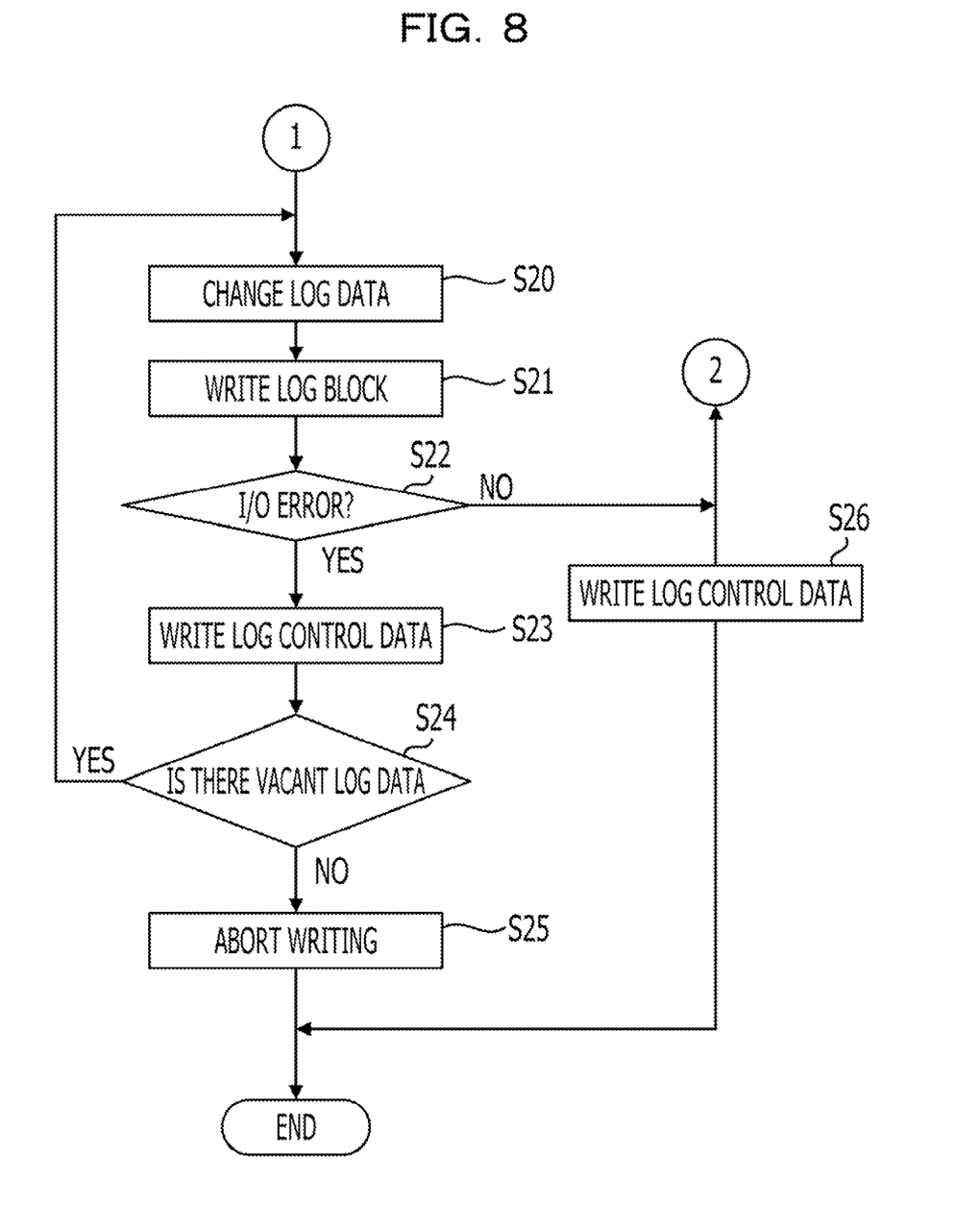
FIG. 8 illustrates a flowchart illustrating an example procedure of a process of writing log blocks in the log data.

A process performed by the node 1 will be first described. FIGS. 7 and 8 are flowcharts illustrating the procedure of a process of writing log blocks in the log data items 102*a*.

The control unit 101 determines whether or not an update request for updating the database 1*a* has been received from the AP server apparatus 3 (Step S10). If the update request has not been received (NO at Step S10), the control unit 101 stands by until the receipt of the update request. If the update request has been received (YES at Step S10), the control unit 101 updates the database 1*a* (Step S11). Then, in accordance with the contents updated at Step S11, the control unit 101 writes log blocks in a log data item 102*a* in accordance with the order of consecutive log numbers (Step S12). For example, when first writing update logs, the control unit 101 writes the log blocks in the log data item 102*a* corresponding to the log number "001."

The control unit 101 determines whether or not an I/O error has occurred in the writing of the log blocks (Step S13). If an I/O error has not occurred (NO at Step S13), the control unit 101 writes information in the log control data item 102*b* (Step S26). For example, the control unit 101 writes, in the "log number" of the log control data item 102*b*, the log number of the log data item 102*a* having the log blocks written therein, and writes "normal" in the "log data state." Further, the control unit 101 writes, in the "written block position," the block number of the log block written in the log data item 102*a*. Then, the control unit 101 completes the present process.

If the I/O error has occurred (YES at Step S13), the control unit 101 writes the I/O error in the log control data item 102*b* to notify the node 2 of the I/O error (Step S14). For example, if the I/O error has occurred in the writing of the update logs in the log data item 102*a* corresponding to the log number "001," the control unit 101 writes "001" in the "log number" of the log control data item 102*b*, and writes "abnormal" in the "log data state." Then, in accordance with the order of log numbers, the control unit 101 changes the log data item 102*a*, in which the log blocks should be written (Step S15). For example, if the I/O error has occurred in the writing of the log blocks in the log data item 102*a* corresponding to the log number "001," the control unit 101 changes the write destination of the log blocks to the log data item 102*a* corresponding to the log number "002." After the change, the control unit 101 writes the log blocks in the changed log data item 102*a* in accordance with the contents updated at Step S11 (Step S16).

The control unit 101 determines whether or not the I/O error has occurred again in the writing of the log blocks in the log data item 102*a* (Step S17). If the I/O error has not occurred (NO at Step S17), the control unit 101 proceeds to the process of Step S26, and writes information in the log control data item 102*b*, as described above. If the I/O error has occurred again (YES at Step S17), the control unit 101 writes the I/O error in the log control data item 102*b* to notify the node 2 of the I/O error, similarly as in Step S14 (Step S18). Then, the control unit 101 aborts the mirror-copying to the node 2 (Step S19). That is, the log data item 102*a* and the log control data item 102*b* are not transmitted to the node 2, and are accumulated only in the node 1.

In accordance with the order of log numbers, the control unit 101 changes the log data item 102*a*, in which the log blocks should be written, similarly as in Step S15 (Step S20). After the change, the control unit 101 writes the log blocks in the changed log data item 102*a* in accordance with the contents updated at Step S11 (Step S21). The control unit 101 determines whether or not the I/O error has occurred in the writing of the log blocks in the log data item 102*a* (Step S22). If the I/O error has not occurred (NO at Step S22), the control unit 101 proceeds to the process of Step S26, and writes information in the log control data item 102*b*, as described above. If the I/O error has occurred again (YES at Step S22), the control unit 101 writes the I/O error in the log control data item 102*b* to notify the node 2 of the I/O error, similarly as in Step S14 (Step S23).

Then, the control unit 101 determines whether or not the storage unit 102 stores a vacant log data item 102*a* capable of having the log blocks written therein (Step S24). If there is a vacant log data item 102*a* (YES at Step S24), the control unit 101 returns to the process of Step S20, and repeats the above-described processes until the writing of the log blocks in another log data item 102*a* succeeds. If there is no vacant log data item 102*a* (NO at Step S24), the control unit 101 aborts the writing of log blocks in the log data item 102*a* (Step S25), and completes the present process. Even if the writing of the log blocks in the log data item 102*a* is aborted, the node 1 performs the process of updating the database 1*a* in accordance with the request from the AP server apparatus 3.

Figure 9:
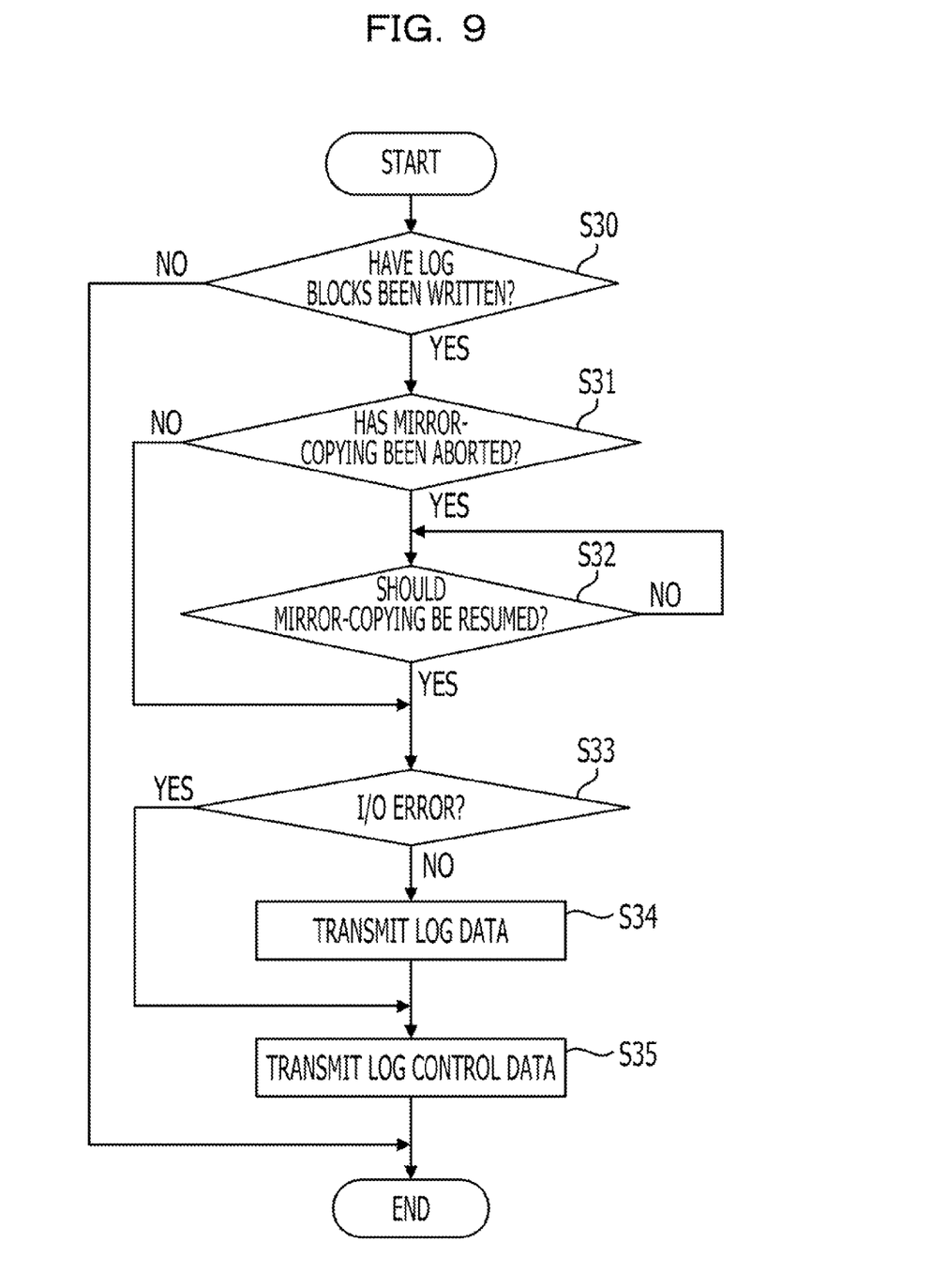
FIG. 9 illustrates a flowchart illustrating an example procedure of a process of transmitting the log data and the log control data to one of the nodes.

FIG. 9 is a flowchart illustrating the procedure of a process of transmitting the log data item 102*a* and the log control data item 102*b* to the node 2. The process illustrated in FIG. 9 is performed by the control unit 101 of the node 1.

The control unit 101 determines whether or not the log blocks have been written in the log data item 102*a* (Step S30). If the log blocks have not been written (NO at Step S30), the control unit 101 completes the present process. If the log blocks have been written (YES at Step S30), the control unit 101 determines whether or not the mirror-copying has been aborted owing to, for example, the occurrence of an abnormality in the node 2, the data conveying path 4, or the like (Step S31). If the mirror-copying has been aborted (YES at Step S31), the control unit 101 determines whether or not to resume the mirror-copying (Step S32). For example, the control unit 101 resumes the mirror-copying in accordance with an input of a resume command from the keyboard or the like to the node 1 or the receipt of an instruction from the AP server apparatus 3. If it is determined not to resume the mirror-copying (NO at Step S32), the control unit 101 stands by until it is determined to resume the mirror-copying. During the aborted state of the mirror-copying, the log data item 102*a* and the log control data item 102*b* are not transmitted to the node 2, even if new information is written.

If the mirror-copying has not been aborted (NO at Step S31), or if it is determined to resume the mirror-copying (YES at Step S32), the control unit 101 determines whether or not the I/O error has occurred in the writing of the log blocks (Step S33). If the I/O error has not occurred (NO at Step S33), it is assumed that the writing of the log blocks has normally been performed. Therefore, the control unit 101 transmits to the node 2 the log data item 102*a*, in which the log blocks have been written (Step S34), and transmits the log control data item 102*b* to the node 2 (Step S35). Then, the control unit 101 completes the present process. Meanwhile, if the I/O error has occurred in the writing of the log blocks (YES at Step S33), the control unit 101 transmits to the node 2 only the log control data item 102*b*, in which the occurrence of the I/O error has been written (Step S35), and completes the present process. When transmitting the log data item 102*a* and so forth after the resumption of the aborted mirror-copying, the control unit 101 transmits the log data item 102*a* and so forth, in which information has been written during the aborted state of the mirror-copying.

Figure 10:
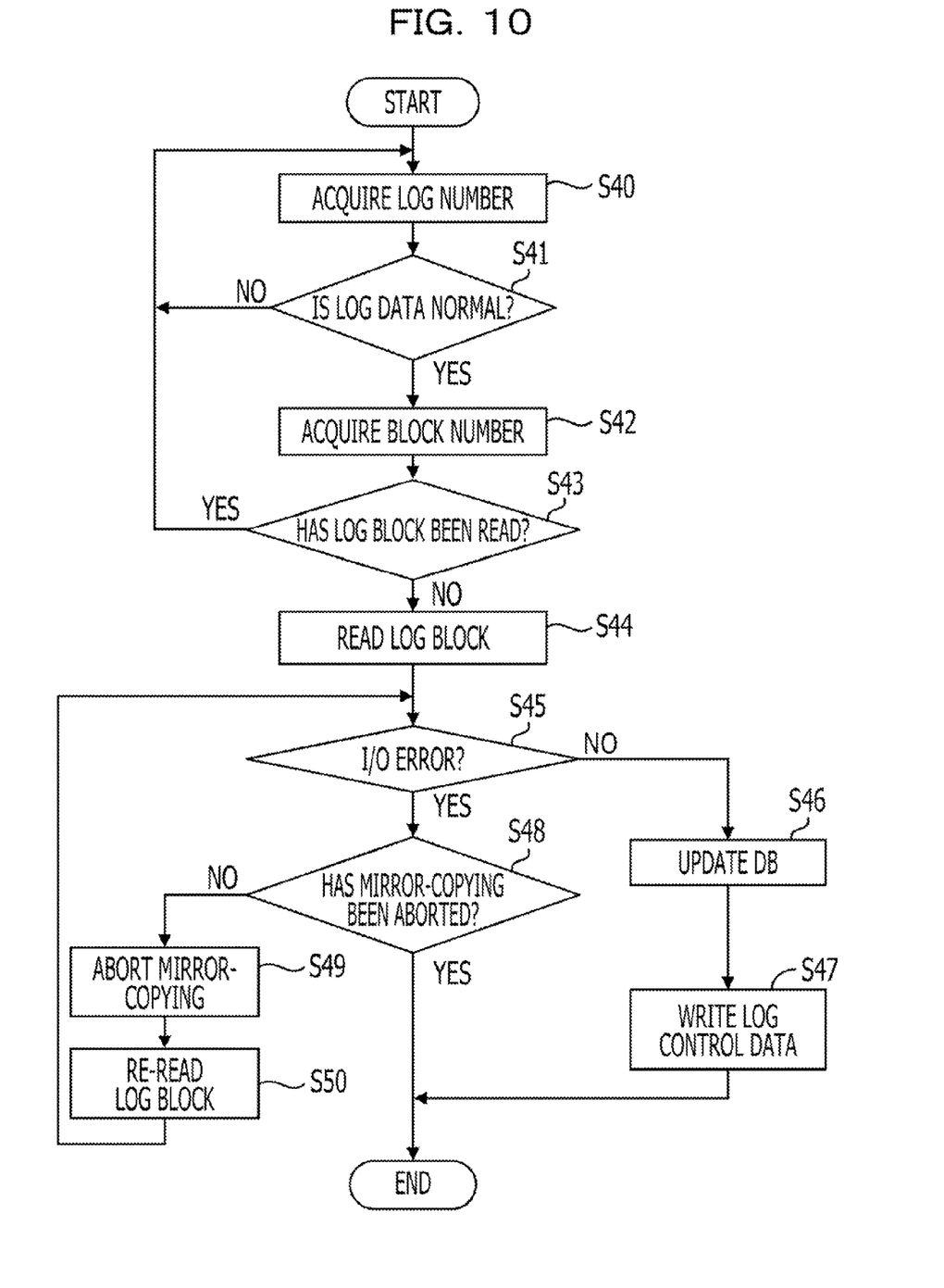
FIG. 10 illustrates a flowchart illustrating an example procedure of a process of reflecting, in a database of one of the nodes, the update of a database of another of the nodes.

Subsequently, a process performed by the node 2 will be described. FIG. 10 is a flowchart illustrating the procedure of a process of reflecting the update of the database 1*a* of the node 1 in the database 2*a* of the node 2.

The control unit 201 reads the log control data item 202b received from the node 1 and stored in the storage unit 202, and acquires the "log number" from the log control data item 202b (Step S40). Then, on the basis of the information of the "log data state" in the log control data item 202b, the control unit 201 determines whether or not the log data item 202a corresponding to the acquired log number is normal (Step S41). If the log data item 202a is not normal (NO at Step S41), the control unit 201 returns the process of Step S40, and acquires another "log number" from the log control data item 202b.

If the log data item 202a corresponding to the acquired log number is normal (YES at Step S41), the control unit 201 acquires the block number from the "written block position" of the log control data item 202b (Step S42), and determines whether or not the corresponding log block has already been read (Step S43). In the already read state, the corresponding log block has already been reflected in the database 2a. If the log block has already been read (YES at Step S43), the control unit 201 returns to the process of Step S40.

If the log block has not been read (NO at Step S43), the control unit 201 reads, from the log data item 202a corresponding to the log number acquired at Step S40, the log block corresponding to the block number acquired at Step S42 (Step S44). The control unit 201 determines whether or not the I/O error has occurred in the reading (Step S45). If the I/O error has not occurred (NO at Step S45), the control unit 201 updates the database 2a by reflecting in the database 2a the update log included in the log block read at Step S44 (Step S46). Then, the control unit 201 writes, in the "read block position" of the log control data item 202b, the block number of the log block read at Step S44 (Step S47), and completes the present process. The log control data item 202b, in which the block number has been written in the "read block position," is transmitted from the node 2 to the node 1.

If the I/O error has occurred in the reading (YES at Step S45), the control unit 201 determines whether or not the mirror-copying has been aborted (Step S48). If the mirror-copying has not been aborted (NO at Step S48), the control unit 201 aborts the mirror-copying (Step S49). If the mirror-copying is in an error suspend status in the node 1, the entire system may be prohibited from accessing data. Accordingly, the mirror-copying is aborted in the node 2, and the reading of the log block the same as the log block read at Step S44 is retried (Step S50) later. Thereafter, the control unit 201 returns to the process of Step S45. If the mirror-copying has been aborted (YES at Step S48), the control unit 201 completes the present process, and aborts the database duplexing. Thereafter, the control unit 201 may resume the process illustrated in FIG. 10 after the elimination of the error in the node 2.

The control unit 201 may update the database 2a by performing the process of FIG. 10 upon accumulation of a specified amount of log data items 202a in the storage unit 202, or upon receipt of a request from the AP server apparatus 3, for example. The timing for the control unit 201 to perform the process of FIG. 10 may be changed as desired and/or required.

As described above, a plurality of log data items 102a for having log blocks written therein are stored in the storage unit 102 and the continuity of the log data items 102a are maintained. Further, if the I/O error occurs in the writing of log blocks, switching is performed between the log data items 102a to allow reliable writing of the log blocks. As a result, it is possible to guarantee the continuity of the log blocks, and thus to perform accurate mirror-copying between the databases 1a and 2a. Further, if an error occurs in the node 2, the log data items 102a are accumulated in the node 1, and the log data items 102a accumulated in the node 1 are transmitted to the node 2 after the elimination of the error. That is, the difference in the log data items 102a between before and after the elimination of the error is transmitted after the elimination of the error. Accordingly, it is possible to complete the mirror-copying between the databases 1a and 2a in a short time.

According to an aspect of the database duplexing system disclosed in the present embodiment, it is possible to guarantee the continuity of logs relating to the update of a database, and thus to achieve accurate consistency between two databases.

Embodiments of the present invention have been specifically described above. However, the respective configurations, operations, and so forth can be altered as required, and are not limited to the above-described embodiments. For example, if the AP server apparatus 3 switches the access destination to the node 2 owing to a failure of the node 1, and if the failure of the node 1 is later eliminated, the AP server apparatus 3 may continue to access the node 2 as the operating node. In this case, the node 1 functions as the standby node described above. Alternatively, after the elimination of the failure of the node 1, the AP server apparatus 3 may switch the access destination back to the node 1 to restore the pre-failure state.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention.

What is claimed is:

1. A system comprising:
    a first apparatus; and
    a second apparatus,
    wherein the first apparatus includes:
        a first storage device; and
        a first processor configured to execute a first process, the first process including:
            generating a log, in response to an update performed on a first database in the first apparatus, related to the update;
            executing a writing process, the writing process writing the log into a target log file among a plurality of log files included in the first storage device;
            writing a log file identifier representing the target log file, a log identifier representing the log and a state representing a result of the writing of the log by the writing process into control information being independent of the plurality of log files based on a result of the executing the writing process, the log identifier representing an order of generation of the log, the state representing whether or not the writing of the log to the target log file by the writing process is completed;
            determining whether the writing process for a first log file as the target log file is completed;
            when it is determined that the writing process for the first log file is completed, copying the log of the first log file to a second storage device included in the second apparatus and transmitting the control information including a first log file identifier representing the first log file as the target log file, the log identifier and a first state representing a completion of the writing of the log by the writing process;

when it is determined that the writing process for the first log file has failed, writing the log into a second log file among the plurality of log files, and copying the log of the second log file to the second storage and transmitting the control information including a second log file identifier representing the second log file as the target log file, the log identifier and the first state, wherein the second apparatus includes:

the second storage device; and a second processor configured to execute a second process, the second process including:

specifying a target log from the copied log in the second storage device based on the control information from the first apparatus;

reading the specified target log from the second storage device; and updating a second database in the second apparatus based on the read log in accordance with the order represented by the control information.

2. The system according to claim 1, wherein the first process further includes:

aborting the copying of the log of the first log file or the second log file to the second storage device when an abnormality occurs in one of the second apparatus and a path between the first apparatus and the second apparatus;

receiving an instruction to resume the aborted copying; and in a case of receiving the instruction, resuming the aborted copying of the log, the log having been stored in the first storage device after the abortion.

3. The system according to claim 1, wherein the second database in the second apparatus is updated in response to the copying.

4. The system according to claim 1, the second process further including:

determining whether the copying causes an error; and aborting the updating when the error has occurred.

5. The system according to claim 1, wherein both of the copying of the log of the first log file and the transmitting of the control information are executed when it is determined that the writing process for the first log file is completed, and only the copying of the copying and the transmitting is executed when it is determined that the writing process for the first log file has failed.

6. The system according to claim 1, wherein the second process includes accumulating each copied log from the first apparatus, and the specifying, the reading and the updating included in the second process with regard to the accumulated copied log is executed when an accumulation of the accumulated copied log is reached to a specified amount.

7. The system according to claim 1, wherein the system is a duplexing system configured by the first apparatus and the second apparatus.

8. The system according to claim 7, wherein one of the first apparatus and the second apparatus is an operating node and other of the first apparatus and the second apparatus is an standby node in the duplexing system at a certain point of time, and the system further comprising:

a third apparatus configured to transmit execution requests of transactions to the operating node via a network.

9. The system according to claim 8, wherein the specifying, the reading and the updating included in the second process with regard to the copied log is executed when a request from the third apparatus is received.

10. A computer-readable, non-transitory storage medium storing a database management program for causing a storage apparatus to execute a process, the process comprising:

performing in a first apparatus steps of generating a log, in response to an update performed on a first database, related to the update;

executing a writing process, the writing process writing the log into a target log file among a plurality of log files included in a first storage device configured to perform copying the written log to a second storage device writing a log file identifier representing the target log file, a log identifier representing the log and a state representing a result of the writing of the log by the writing process into control information being independent of the plurality of log files based on a result of the executing the writing process, the log identifier representing an order of generation of the log, the state representing whether or not the writing of the log to the target log file by the writing process is completed;

determining whether the writing process for a first log file as the target log file is completed;

when it is determined that the writing process for the first log file is completed, copying the log of the first log file to a second storage device included in the second apparatus and transmitting the control information including a first log file identifier representing the first log file as the target log file, the log identifier and a first state representing a completion of the writing of the log by the writing process;

when it is determined that the writing process for the first log file has failed, writing the log into a second log file among the plurality of log files, and copying the log of the second log file to the second storage and transmitting the control information including a second log file identifier representing the second log file as the target log file, the log identifier and the first state; and performing in a second apparatus specifying a target log from the copied log in the second storage device based on the control information from the first apparatus;

reading the specified target log from the second storage device; and updating a second database in the second apparatus based on the read log in accordance with the order represented by the control information.

11. A method executed in a system including a first apparatus including a first database and a second apparatus including a second database, the method comprising:

performing in the first apparatus generating a log, in response to an update performed on the first database, related to the update;

executing a writing process, the writing process writing the log into a target log file among a plurality of log files included in a first storage device of the first apparatus;

writing a log file identifier representing the target log file, a log identifier representing the log and a state representing a result of the writing of the log by the writing process into control information being independent of the plurality of log files based on a result of the executing the writing process, the log identifier representing an order of generation of the log, the state representing whether or not the writing of the log to the target log file by the writing process is completed;

determining whether the writing process for a first log file as the target log file is completed;

when it is determined that the writing process for the first log file is completed, copying the log of the first log file to a second storage device included in the second apparatus and transmitting the control information including a first log file identifier representing the first log file as the target log file, the log identifier and a first state representing a completion of the writing of the log by the writing process;

when it is determined that the writing process for the first log file has failed, writing the log into a second log file among the plurality of log files, and copying the log of the second log file to the second storage device instead of the log of the first log file when it is determined that the writing fails and transmitting the control information including a second log file identifier representing the second log file as the target log file, the log identifier and the first state;

performing in the second apparatus specifying a target log from the copied log in the second storage device based on the control information from the first apparatus;

reading the specified target log from the second storage device; and updating the second database based on the read log in accordance with the order represented by the control information.

* * * * *